United States Patent [19]

Haas et al.

[11] 4,031,258

[45] June 21, 1977

[54] INORGANIC SALTS OF DIPEPTIDE SWEETENERS

[75] Inventors: Gerhard J. Haas, Woodcliff Lake, N.J.; Jeffrey H. Berg, Riverdale, N.Y.

[73] Assignee: General Foods Corporation, White Plains, N.Y.

[22] Filed: Mar. 30, 1972

[21] Appl. No.: 239,792

[52] U.S. Cl. .......................... 426/548; 260/112.5 R
[51] Int. Cl.$^2$ ........................................ A23L 1/236
[58] Field of Search ...................... 99/141 A, 141 R; 260/112.5; 426/548

[56] References Cited

UNITED STATES PATENTS

| | | | |
|---|---|---|---|
| 3,475,403 | 10/1969 | Mazur et al. | 99/141 A |
| 3,492,131 | 1/1970 | Schlatter | 99/141 A |
| 3,642,491 | 2/1972 | Schlatter | 99/141 A |
| 3,678,026 | 7/1972 | Ariyoshi et al. | 99/141 A |
| 3,695,898 | 10/1972 | Hill et al. | 99/141 A |
| 3,798,204 | 3/1974 | Nakayima et al. | 426/548 X |

OTHER PUBLICATIONS

Mazur et al., "Structure-Taste Relationships of Some Dipeptides," J. Amer. Chem. Soc., May 7, 1969, pp. 2684–2691.
Mazur et al., "Structure-Taste Relationships of Aspartic Acid Amides J. of Medicinal Chemistry," vol. 13, No. 6, 1970, pp. 1217–1221.
Noller, Chemistry of Organic Compounds, 1965, W. B. Saunders Co., Philadelphia, pp. 180–181.
Fieser et al., 1961, Advanced Organic Chemistry, Reinhold Publ. Corp., New York, pp, 366–367.

*Primary Examiner*—Joseph M. Golian
*Attorney, Agent, or Firm*—Bruno P. Struzzi; Daniel J. Donovan; Thomas R. Savoie

[57] ABSTRACT

Readily soluble, sweetening compositions comprising the inorganic salts of dipeptide sweeteners.

19 Claims, No Drawings

INORGANIC SALTS OF DIPEPTIDE SWEETENERS

BACKGROUND OF THE INVENTION

This invention relates to dipeptide sweeteners having improved solubility without significant loss of original sweetness. More specifically, it relates to the preparation of the inorganic salts of the dipeptide sweeteners.

It has recently been found that certain dipeptide compounds possess an intense sweetness. Examples of these compounds are set forth in U.S. Pat. Nos. 3,475,403 issued Oct. 28, 1969, 3,492,131 issued Jan. 27, 1970, and in the following foreign patents; Republic of South Africa Pat. Nos. 695,083 published July 12, 1969, 695,910 published Aug. 14, 1969 and German Pat. No. 2,054,545 published May 19, 1971. Generically, these compounds are represented by the formula:

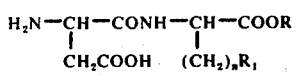

wherein R represents the lower alkyls, lower alkyaryls and cycloalkyls; $n$ stands for integers 0–5; $R_1$ represents a) phenyl group, b) lower alkyls, c) cycloalkyls, d) $R_2$

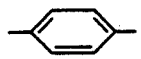

where $R_2$ is hydroxy, lower alkoxy, lower alkyl, halogen, e) $S(O)_m$ (lower alkyl) where $m$ is 0, 1 or 2 and provided $n$ is 1 or 2, f) $R_3$

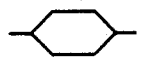

where $R_3$ represents an hydroxy or alkoxy and g)

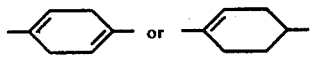

single or double unsaturated cycloalkyls with up to eight carbons. Most suitable among these compounds are the lower alkyl esters of aspartyl phenylalanine (U.S. Pat. No. 3,492,131) wherein the stereochemical configuration is DL-L, L-L, DL-DL, or L-DL. Illustrative of the lower alkyl esters are methyl, ethyl, propyl, butyl, pentyl, hexyl, heptyl and the branched chain groups isomeric therewith, with the methyl ester being the most preferred embodiment.

These dipeptides of Formula I have significant sweetening properties. Problems have arisen however, with the use of these compounds in dry systems in that their rate of solution into aqueous medium is markedly slower than sucrose, as exemplified by the methyl ester of L-aspartyl-L-phenylalanine.

SUMMARY OF THE INVENTION

It has been found that the inorganic salts of dipeptide sweeteners maintain their sweet characteristics and exhibit improved solubility compared to the unsubstituted dipeptide. Specifically, the inorganic salts of the lower alkyl esters of aspartyl phenylalanine, e.g., the sodium and potassium salts, and the ammonium salts of sulfuric acid and phosphoric acid, are sweet and in all cases are faster to dissolve than the unsubstituted aspartyl phenylalanine. Since formation of salts involves structural modifications of the aspartic acid portion of the compounds of Formula I the maintenance of the sweet character was surprising because of contradictory information which appeared in the May 7, 1969 issue of the "Journal of the American Chemical Society" Vol. 91, No. 10,2684 at 2685 concerning the L-aspartyl-L-phenylalanine methyl ester; "The presence of both the free, unsubstituted amino and one carboxyl group of aspartic acid as well as the distance between them and the absolute configuration of the asymmetric carbon are completely critical" [for sweetness].

This claim was reiterated in a later publication appearing in the Journal of Medicinal Chemistry, 1970, vol. 13, No. 6, p. 1217 entitled "Structure-Taste Relationships of Aspartic Acid Amides" by Mazur et al. in which emphasis was made on the necessity of maintaining a free, unsubstituted $NH_2$ and one $CO_2H$ on the aspartic acid portion of the dipeptide. Again, the maintenance of this structure for sweetness was stressed.

The inorganic salts of the dipeptide sweeteners are prepared both by substituting the amine group on the aspartic acid portion, or by substituting the carboxyl group on said acid portion. The resulting salts are extremely fast-dissolving which is a distinct advantage over the unsubstituted aspartyl phenylalanine esters and which is, in addition, an unexpected result with reference to prior art previously cited.

The general purpose of this invention is to provide sweeteners that have all the advantages of similarly employed dipeptides and have none of the previously mentioned disadvantages. To attain this, the present invention comprises a structurally modified dipeptide to obtain a readily soluble inorganic salt of the sweetener.

DESCRIPTION OF THE INVENTION

The dipeptide salts of this invention are described in formula:

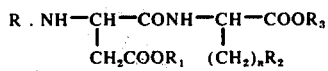

wherein: The stereochemical configuration is DL-DL, DL-L, L-DL, or L-L; R represents $H_4PO_4^+$, $H_3SO_4^+$, $H_2NO_3^+$ or hydrogen; $R_1$ represents sodium, potassium, calcium, ammonium, or hydrogen, $R_3$ represents lower alkyl, lower alkylaryl and cycloalkyl; $n$ represents an integer of 0 to 5; $R_2$ represents a) lower alkyl, b) a substituted or unsubstituted unsaturated, partially saturated or totally saturated six carbon hydrocarbon ring provided that when substituted, the substituent is at the four position and is hydroxy, lower alkoxy, lower alkyl or halogen; and c) $S(O)_m$ lower alkyl) provided that $n$ is 1 or 2 and $m$ is 0, 1 or 2.

Representative of the salts of this invention are sodium L-aspartyl-L-phenylglycine methyl ester, sodium L-aspartyl-L-phenylalanine methyl ester, sodium L-aspartyl-L-cyclohexylalanine methyl ester, potassium L-aspartyl-L-tyrosine methyl ester, potassium L-aspartyl-L-tyrosine ethyl ester, potassium L-aspartyl-L-O-methyl tyrosine methyl ester, potassium L-aspartyl-L-O-ethyl tyrosine methyl ester, L-aspartyl-L-methionine methyl ester dihydrogen phosphate, L-aspartyl-L-S-methyl cysteine methyl ester dihydrogen phosphate, L-aspartyl-L-methionine sulfone methyl ester dihydrogen phosphate, L-aspartyl-L-S-methyl cysteine sulfone methyl ester dihydrogen phosphate and the like.

The salts are prepared by forming a solution of the dipeptide and the inorganic compound in a solvent and removing the solvent by known means. This can be done by forming a solution of the dipeptide in a solvent and contacting the dipeptide with the inorganic compound to form a soluble salt or by dissolving the dipeptide in an alkaline solvent medium. For example, in the case of the sodium salt of aspartyl phenylalanine methyl ester, an aqueous solution of this dipeptide is neutralized with an equimolar concentration of sodium bicarbonate. The resulting solution is freeze dried, yielding an inorganic salt of aspartyl phenylalanine methyl ester which is equally as sweet as the unsubstituted dipeptide but which is approximately 50 times faster to dissolve.

The significance of the fast-dissolving properties of the inorganic salts particularly the sodium salt, cannot be over emphasized in an age where almost without exception, everything in the food and beverage field is an instant product and geared toward convenience for the consumer particularly in saving time. The salts also fill the need for a fast-dissolving low calorie sweetener for the calorie-cautious public.

The inorganic salts are extremely useful in beverage systems. Because of their high rate of solubility in aqueous systems they are ideal as sweetening agents in dry beverage systems.

These inorganic salts particularly the sodium salt, are also fast-dissolving in carbonated water. The advantages of using instantaneously-soluble salts in carbonated beverages where stirring would be undesirable are evident. For example when aspartyl phenylalanine methyl ester is incorporated into a carbonated beverage, the amount of stirring needed to effectively put the aspartyl phenylalanine methyl ester into solution removes most, if not all carbonation. However, when the substituted sodium salt of aspartyl phenylalanine methyl ester is incorporated into the same system, the solubility of the salt alleviates the need of stirring and the carbonation is maintained. The salt dissolves in a matter of seconds.

The inorganic salts of dipeptide sweeteners can be incorporated into all types of foodstuffs, the most suitable being the substantially dry food systems which are reconstituted with water at the time of preparation. A dry system is necessary in order to prevent hydrolysis of the salt and breakdown of the dipeptide which occurs after prolonged storage. Of course, the salts can be incorporated into a liquid, non-aqueous medium but this offers little advantage over employing the unreacted dipeptide itself.

The dipeptide salts are the preferred embodiment in this invention for the rapid sweetening of dry or aqueous beverages, particularly carbonated beverages where no mixing can be tolerated. The way to employ these is via a carrier.

In order to prevent hydrolysis of the salt and consequently a loss of sweetness over a prolonged period of storage, the salts are incorporated into a dry carrier which should be rapidly soluble in water and resistant to moisture to prevent hydrolysis of the salt and dipeptide. Examples of such a carrier are the hydrophilic colloids such as gelatin, gums, dextrins and the like, water soluble or dispersible carbohydrates such as lactose, sucrose, maltose, partially hydrolyzed starches such as corn syrup solids and solid polyhydric alcohols such as Mannitol and the like.

Generally, the preferred fixative materials are the sugars and corn syrup solids since these are usually used in powdered food formulations as sweetening agents. However, if it is intended that the product be stored under conditions such that the powdered mix will be exposed to humid air, it is preferable to use those materials which are non-hygroscopic carriers resistant to water absorption and cold water soluble such as Mannitol and enzymatically modified dextrins having dextrose equivalents of between 5–10, little or no glucose and having a preponderance of tramer, hexamer and heptamer polymers of glucose which impart nonhygroscopic properties.

The amount of water added initially to the carbohydrate material is not critical. Any amount can be used varying from the least amount necessary to effect hydration of the carbohydrate to an amount sufficient to completely disperse or dissolve the carbohydrate as long as the quantity is adequate for incorporation of the salt. What is critical is the subsequent removal of a sufficient amount of water to prevent hydrolysis of the salt during storage. Formation of the carrier therefore involves the wetting of said carrier to dissolve and incorporate the inorganic salt and the subsequent removal of a sufficient amount of water to prevent hydrolysis of the inorganic salt.

The economics of the process also influences the amount of water to be added to the carbohydrate, for example, if the sweetening composition is to be freeze dried it is necessary, from a cost standpoint to use as little water as possible because water removal by freeze drying is expensive and time consuming.

The drying method can be any of the well known drying methods such as spray drying, freeze drying or drum drying. All three methods have been tested and prove to be efficient means of drying the inorganic salt of the dipeptide.

The fast-dissolving sweetening compositions of the present invention can be packaged as is for addition to liquid beverages or can be packaged with dry foods and dry beverage systems such as cake mixes, pudding mixes, gelatin, desserts, "Tang," "Kool-Aid," and the like. The shelf storage life of the inorganic salts of the dipeptide sweeteners can be extended indefinitely if it is incorporated into hermetically sealed packages of dry food and dry beverage systems which are stored under conditions of very low humidity.

The inorganic salts of the dipeptide sweeteners, aspartyl phenylalanine methyl ester being the preferred embodiment for said salts, are, therefore, distinct improvements over the unsubstituted aspartyl phenylalanine methyl ester because they are fast dissolving in themselves, and alleviate numerous problems occurring in any food and/or beverage system where the rate of solubility of an additive is an important factor.

The processes of this invention are further illustrated but not limited by the following examples:

EXAMPLE I

A 1% aqueous solution of aspartyl phenylalanine methyl ester was neutralized with an equimolar amount of sodium bicarbonate. The pH went from 4.4 to 6.8. Subsequently, the solution was freeze dried. A sample of the sodium salt completely dissolved in water (1% solution) in 7 seconds. By contrast, a freeze-dried sample of aspartyl phenylalanine methyl ester (of equal bulk density) required more than 10 min. to completely dissolve. Organoleptic evaluations of aspartyl phenylalanine methyl ester and its sodium salt were then carried out by diluting a .1% solution of aspartyl phenylalanine methyl ester and said salt to a concentration level at which the sweet taste is just recognizable. This evaluation revealed that aspartyl phenylalanine methyl ester and the sodium salt of this dipeptide ester are equally sweet. The sodium salt of aspartyl phenylalanine methyl ester was also found to have an absolute solubility of 5.6% compared to the 1% limit of aspartyl phenylalanine methyl ester, an added advantage over the latter.

The same test was carried out with the potassium salt of aspartyl phenylalanine methylester. Said salt was found to exhibit a far greater solubility than aspartyl phenylalanine methyl ester but slightly less than that of the sodium salt.

EXAMPLE II

The ammonium dihydrogen phosphate salt of aspartyl phenylalanine methyl ester was prepared by recrystallizing the sweetener from an $H_3PO_4$ solution in the following manner:

Four grams of aspartyl phenylalanine methyl ester were dissolved in 50 ml. of a .05 M $H_3PO_4$ solution. The voluminous precipitate was filtered off under vacuum and vacuum air dried. At a concentration of 0.07% (by weight) the needles dissolved with stirring in room temperature water in less than 7 seconds and in approximately 35 seconds in cold carbonated water without stirring as compared to the unsubstituted aspartyl phenylalanine methyl ester which required a total of five minutes to dissolve completely.

The same procedure was carried out using 0.05 M $H_2SO_4$ (50 ml.) and 4 gms. of the aspartyl phenylalanine methyl ester. The resulting vacuum dried precipitate, aspartyl phenylalanine methyl ester ammonium bisulfate, had a rate of solubility equal to that of the ammonium dihydrogen phosphate salt of aspartyl phenylalanine methyl ester.

What is claimed is:

1. An artificially sweetened foodstuff comprising a foodstuff and a dry dipeptide salt sweetener selected from the formula

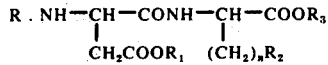

wherein:
The stereochemical configuration is DL=DL, DL-L, L-DL or L=L;
when $R_1$ is hydrogen, R is $H_3SO_4^+$, $H_4PO_4^+$, or $H_2NO_3^+$; n represents an integer of 0 to 5;
where R hydrogen, $R_1$ is sodium, potassium, calcium, or ammonium;
$R_3$ represents lower alkyl, lower alkylaryl and cycloalkyl;
$R_2$ represents
 a. lower alkyl
 b. a substituted or unsubstituted, partially saturated or totally saturated six carbon ring provided that when substituted, the substituent is at the four position and is hydroxy, lower alkoxy, lower alkyl or halogen; and
 c. $S(O)_m$ (lower alkyl) provided that n is 1 or 2 and m is 0, or 2, said dry dipeptide salt sweetener being present in an amount effective to sweeten the foodstuff, said dipeptide salt being faster to dissolve than the corresponding unsubstituted dipeptide sweetener.

2. The foodstuff of claim 1 wherein:
n represents 0 or 1;
R represents $H_4PO_4^+$;
$R_1$ is hydrogen;
$R_3$ represents lower alkyl; and
$R_2$ represents phenyl, cyclohexyl, benzyl, 1,4-cyclohexadienyl or 1-cyclohexenyl.

3. The foodstuff of claim 2 wherein the sweetener is L-aspartyl-L-phenylalanine methyl ester dihydrogen phosphate.

4. The foodstuff of claim 1 wherein:
n represents 0 or 1;
R is hydrogen;
$R_1$ is sodium;
$R_3$ represents lower alkyl; and
$R_2$ represents phenyl, cyclohexyl, benzyl, 1,4-cyclohexadienyl or 1-cyclohexenyl.

5. The foodstuff of claim 4 wherein the sweetener is sodium L-aspartyl-L-phenylalanine methyl ester.

6. A method of sweetening a foodstuff which comprises adding thereto a dry dipeptide salt sweetener of the formula

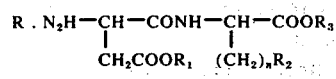

wherein:
The stereochemical configuration is DL=DL, DL-L, L-DL or L=L;
when $R_1$ is hydrogen, R is $H_3SO_4^+$, $H_4PO_4^+$, or $H_2NO_3^+$; n represents an integer of 0 to 5;
where R hydrogen, $R_1$ is sodium, potassium, calcium or ammonium;
$R_3$ represents lower alkyl, lower alkylaryl and cycloalkyl;
$R_2$ represents
 a. lower alkyl
 b. a substituted or unsubstituted, partially saturated or totally saturated six carbon ring provided that when substituted, the substituent is at the four position and is hydroxy, lower alkoxy, lower alkyl or halogen; and
 c. $S(O)_m$ provided that n is 1 or 2 and m is 0, 1 or 2, said dry dipeptide salt sweetener being present in an amount effective to sweeten the foodstuff, said dipeptide salt being faster to dissolve than the corresponding unsubstituted dipeptide sweetener.

7. The method of claim 6 wherein the sweetener is L-aspartyl-L-phenylalanine methyl ester dihydrogen phosphate.

8. The method of claim 6 wherein the sweetener is sodium L-aspartyl-L-phenylalanine methyl ester.

9. A dry sweetening composition comprising an edible carrier and a dipeptide salt sweetener selected from the formula:

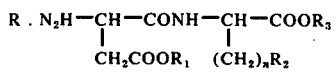

wherein:

The stereochemical configuration is DL=DL, DL-L, L-DL or L=L;
when $R_1$ is hydrogen, R is $H_3SO_4^+$, $H_4PO_4^+$, or $H_2NO_3^+$; n represents an integer of 0 to 5;
where R hydrogen, $R_1$ is sodium, potassium, calcium or ammonium;
$R_3$ represents lower alkyl, lower alkylaryl and cycloalkyl;
$R_2$ represents
 a. lower alkyl
 b. a substituted or unsubstituted, partially saturated or totally saturated six carbon ring provided that when substituted, the substituent is at the four position and is hydroxy, lower alkoxy, lower alkyl or halogen; and
 c. $S(O)_m$ (lower alkyl) provided that n is 1 or 2 and m is 0, or 2.
said sweetener being encased in a major amount of a dry, edible carrier, said carrier being selected from the group consisting of hydrophilic colloids not having free amine groups, water dispersible dextrins, partially hydrolyzed starches, sugars, polyhydric alcohols, and mixtures thereof.

10. The composition of claim 9 wherein the sweetener is L-aspartyl-L-phenylalanine methyl ester dihydrogen phosphate.

11. The composition of claim 9 wherein the carrier is a non-hygroscopic carbohydrate.

12. The composition of claim 9 wherein the sweetener is sodium L-aspartyl-L-phenylalanine methyl ester.

13. The composition of claim 9 wherein the sweetener is L-aspartyl-L-cyclohexylalanine methyl ester dihydrogen phosphate.

14. The composition of claim 9 wherein the sweetener is sodium L-aspartyl-L-cyclohexylalanine methyl ester.

15. A dry salt of a dipeptide sweetener selected from the formula

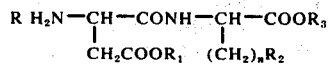

wherein:
the stereochemical configuration is DL-DL, DL-L, L-DL, or L-L;
n represents an integer of 0 to 5;
Where R is hydrogen, $R_1$ is sodium, potassium, calcium or ammonium;
Where $R_1$ is hydrogen, R is $H_3SO_4^+$, $H_4PO_4^+$, or $H_2NO_3^+$
$R_3$ represents lower alkyl, lower alkylaryl and cycloalkyl;
$R_2$ represents
 a. lower alkyl
 b. a substituted or unsubstituted, partially saturated or totally saturated six carbon ring provided that when substituted, the substituent is at the four position and is hydroxy, lower alkoxy, lower alkyl or halogen; and
 c. $S(O)_m$ (lower alkyl) provided that n is 1 or 2 and m is 0, 1, or 2.

16. A dry salt of claim 15 wherein:
n represents 0 or 1
$R_3$ represents lower alkyl; and
$R_2$ represents phenyl, cyclohexyl, benzyl, 1, 4-cyclohexadienyl or 1-cyclohexenyl.

17. An L-aspartyl-L-phenylalanine methyl ester inorganic salt of claim 15.

18. The dihydrogen phosphate salt of claim 17.

19. The sodium salt of claim 17.

* * * * *